H. F. W. KOHLBACH.
LAWN MOWER SHARPENER.
APPLICATION FILED MAY 27, 1916.
1,226,675.
Patented May 22, 1917.
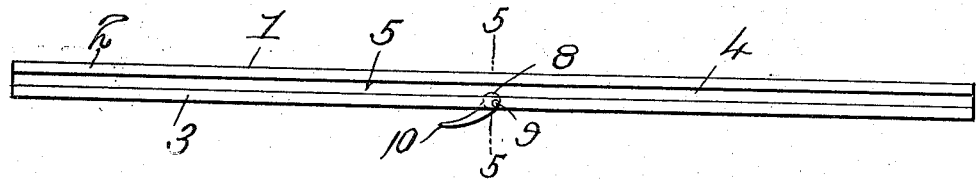
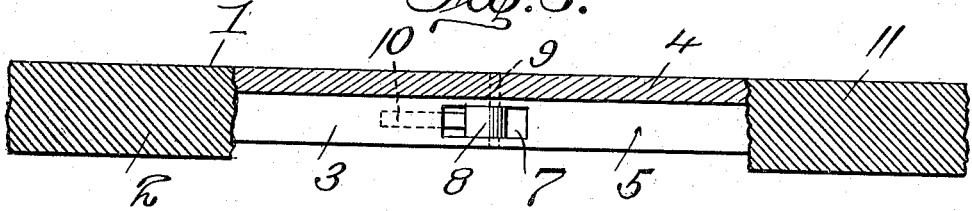
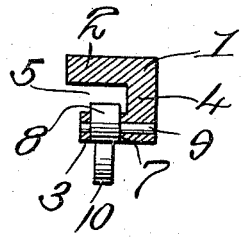
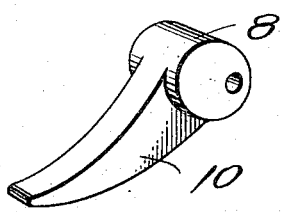
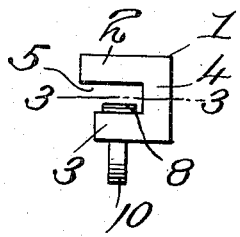
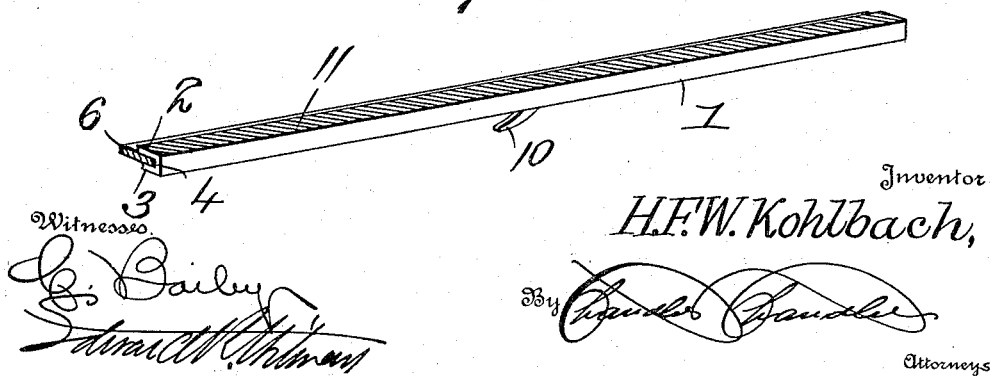
Witnesses
Inventor
H.F.W. Kohlbach,
By
Attorneys

UNITED STATES PATENT OFFICE.

HENRY F. W. KOHLBACH, OF NEW BEDFORD, MASSACHUSETTS.

LAWN-MOWER SHARPENER.

1,226,675.  Specification of Letters Patent.  Patented May 22, 1917.

Application filed May 27, 1916. Serial No. 100,261.

*To all whom it may concern:*

Be it known that I, HENRY F. W. KOHLBACH, a citizen of the United States, residing at New Bedford, in the county of Bristol, State of Massachusetts, have invented certain new and useful Improvements in Lawn-Mower Sharpeners; and I do hereby declare the following to be a full, clear, and exact description of the invention, such as will enable others skilled in the art to which it appertains to make and use the same.

This invention relates to sharpening devices for lawn mowers, and has particular reference to an attachment which may be mounted upon a lawn mower to sharpen the blades as the latter are revolved by operating the machine.

As its object, this invention purposes to provide a simple attachment for mowing machines which may be quickly applied or removed, without modification of the mowing machine structure. The blades of mowing machines require frequent sharpening, and if this can be accomplished by the operation of the lawn mower, to thus utilize the rapid rotation of the blades to maintain the blades in a sharpened condition, much labor and tedious effort can be avoided. The blades, when sharpened by my improved device are also trued simultaneously with the sharpening operation.

My invention therefore contemplates the provision of a sharpening strip which may be readily clipped upon a mowing machine frame to operate upon the rotating blades.

With the above and other objects in view, as will hereinafter appear, my invention will now be fully set forth and described, reference being had to the accompanying drawings.

In said drawings:—

Figure 1 is a longitudinal elevation,

Fig. 2 is an end view,

Fig. 3 is a section on the line 3—3 of Fig. 2,

Fig. 4 is a perspective view of the locking device,

Fig. 5 is a section on line 5—5 of Fig. 1, and

Fig. 6 is a perspective view of the device as applied to the stationary blade of a mowing machine.

Referring more particularly to the drawings, 1 represents a metallic body of a length corresponding to that of the stationary cutting blade of a mowing machine. Said body 1 consists of a top plate 2, and a base plate 3 which are joined along their rear edges by a vertical web 4. The top plate 2 and the bottom plate 3 are spaced apart to provide the intermediate space 5 into which the stationary blade 6 of the mowing machine is adapted to project, as indicated in Fig. 6. The lower plate 3, half way between its ends, is provided with a recess 7, in which is housed an eccentric roller or cam 8. The roller 8 is journaled on a pin 9 which extends through the bottom plate 3 from front to rear, and provides a bearing upon which the eccentric 8 may be turned to throw the latter into the space 5.

Projecting over one side of the eccentric 8 and extending below the bottom plate 3 is a finger piece 10, by means of which the eccentric may be manipulated. When the device is placed upon the stationary blade of a mowing machine, the eccentric provides a locking device for securely clamping the same upon the blade. The upper surface of the top plate 2 is provided with a filing or sharpening surface 11, across which the rotary blades of the mowing machine are adapted to draw when the machine is operated. The body 1 may be formed of a suitable material from which the filing surface may be made, or else the body may be faced with a suitable hard material to support the filing surface.

In applying the device to a mowing machine, the body 1 is shoved upon the forward edge of the stationary blade 6, and the eccentric cam 8 thrown into locking position. The cam 8 bears below the plate 6 and thereby draws the upper plate into firm contact with the blade. In order to provide sufficient clearance for the rotary blades to pass the filing surface, the proper adjustment of the stationary blade is made in order to lower the filing surface sufficiently, the usual set screws used to set up the stationary blade being utilized for this purpose.

What I claim as my invention is:—

A sharpening device for mowing machines, comprising in combination, a body provided with a sharpening surface and consisting of upper and lower plates adapted to embrace the upper and lower sides of the stationary blade of a mowing machine, said upper and lower plates carrying the sharpening surface, a web joining said plates, and an eccentric cam journaled in the lower plate and mounted to draw the upper plate into close contact with the upper face of said stationary blade, by direct action against the lower face of the latter.

In testimony whereof, I affix my signature, in the presence of two witnesses.

HENRY F. W. KOHLBACH.

Witnesses:
CHAS. N. RICHMOND,
CHAS. A. DAMON.

Copies of this patent may be obtained for five cents each, by addressing the "Commissioner of Patents, Washington, D. C."